(12) United States Patent
Mack et al.

(10) Patent No.: US 6,736,158 B2
(45) Date of Patent: May 18, 2004

(54) SPLITTING DEVICE FOR PRESSURE MEDIUM DUCTS AND A DUCT COMPONENT HAVING SAME

(75) Inventors: Reinhold Mack, Aichwald (DE); Rainer Bertsch, Stuttgart (DE)

(73) Assignee: Festo AG & Co., Esslingen (DE)

( * ) Notice: Subject to any disclaimer, the term of this patent is extended or adjusted under 35 U.S.C. 154(b) by 141 days.

(21) Appl. No.: 10/223,861

(22) Filed: Aug. 20, 2002

(65) Prior Publication Data

US 2003/0038477 A1 Feb. 27, 2003

(30) Foreign Application Priority Data

Aug. 23, 2001 (DE) ..................................... 201 13 958 U

(51) Int. Cl.$^7$ .............................................. F16K 51/00
(52) U.S. Cl. ......................................... 137/269; 138/89
(58) Field of Search ................................. 137/269, 271, 137/884; 138/89

(56) References Cited

U.S. PATENT DOCUMENTS

| | | | |
|---|---|---|---|
| 3,215,158 A | * 11/1965 | Bass, Jr. et al. | ............. 137/269 |
| 3,509,904 A | * 5/1970 | Olson | .......................... 137/269 |
| 3,513,876 A | * 5/1970 | Tarbox | ........................ 137/269 |
| 3,707,163 A | * 12/1972 | Hugler | ....................... 137/271 |
| 3,747,623 A | * 7/1973 | Greenwood et al. | ........ 137/269 |
| 4,770,209 A | 9/1988 | Neff | |
| 5,950,661 A | * 9/1999 | Kirchhoff-Stewens | ...... 137/269 |

FOREIGN PATENT DOCUMENTS

| | | |
|---|---|---|
| DE | 3824846 A1 | 2/1989 |
| DE | 4120300 C2 | 12/1992 |
| DE | 4213732 A1 | 10/1993 |
| DE | 19508235 A1 | 9/1996 |
| DE | 19704006 C2 | 9/1997 |
| GB | 2257472 A | 1/1993 |

\* cited by examiner

Primary Examiner—John Fox
(74) Attorney, Agent, or Firm—Hoffmann & Baron, LLP

(57) ABSTRACT

A duct splitting device for fluid-tight splitting of a pressure medium duct provided in a duct component into two sequentially following duct sections. It comprises a duct splitter able to be inserted as far as the position of splitting into the respective pressure medium duct, such duct splitter having sealing means provided for engagement with the wall of the pressure medium duct. Furthermore it is provided with securing means for holding the duct splitter at the position of splitting. The duct splitter is in the form of a plug-like adapted shape section able to be placed in the respective pressure medium duct and the securing means are in the form of locking means, which comprise at least one locking part able to be introduced through a transverse duct opening into the pressure medium duct and brought in a locking engagement with the duct splitter.

18 Claims, 2 Drawing Sheets

SPLITTING DEVICE FOR PRESSURE MEDIUM DUCTS AND A DUCT COMPONENT HAVING SAME

The application claims priority from Application Ser. No. 201 13 958.8 filed on Aug. 23, 2001.

BACKGROUND OF THE INVENTION

The invention relates to a duct splitting device for the fluid-tight splitting of a pressure medium duct provided in a duct component into two sequentially placed duct sections, comprising a duct splitter adapted to be inserted as far as the desired point of splitting into the respective pressure medium duct, such duct splitter having sealing means adapted for sealing cooperation with the wall of the pressure medium duct, and furthermore securing means for fixing the duct splitter at the position of splitting.

Furthermore the invention relates to a duct component having at least one pressure medium duct and is fitted with a duct splitting device of the type initially mentioned.

THE PRIOR ART

The German patent publication 19,704,006 C2 describes a duct component designed as a valve carrier, which has a plurality of pressure medium ducts running through it, from which branch ducts extend opening at a component mounting face. On such component mounting face valves may be mounted which are supplied by way of the pressure medium ducts of the duct component with pressure medium. One of the pressure medium ducts is split up by way of a splitting device in a sealing manner into two sequentially placed duct sections so that different pressure zones may be produced. The duct splitting device comprises a duct splitter made up of a plurality of individual components and may be inserted as far as the desired point of splitting into the respective pressure medium duct. Here it may be braced against the duct wall by the operation of an integrated clamping means and secured stationarily in position. Simultaneously during the clamping operation an annular seal is thrust against the duct wall.

Although the known duct splitting device functions reliably, the number, which is still relatively large of components is a disadvantage and this leads to a complex manufacture and fitting. The screwing operation necessary for the actuation of the clamping means furthermore entails a accessibility of the duct splitter from both sides, something which always leads to problems when the associated pressure medium duct is extremely long. Furthermore, there is the risk of leaks owing to the seal's being insufficiently braced against the duct wall unintentionally. Finally there are problems associated with using the known design for duct splitters having an extremely small diameter.

SHORT SUMMARY OF THE INVENTION

One object of the present invention is to provide a duct splitting device of the type initially mentioned which has a simple structure, may be simply installed with a reliable sealing action and furthermore is suitable for systems with small dimensions. Moreover, a duct component is to be created, which is fitted with at least one duct splitting device fulfilling these conditions.

In order to achieve this object in a duct splitting device of the type initially mentioned there is a provision such that the duct splitter is designed in the form of a plug-like adapted shape able to be set in the respective pressure medium duct, such adapted shape having sealing means arranged at its outer periphery and the securing means are designed in the form of locking means and comprise at least one locking part able to be brought into locking engagement with the duct splitter through a transverse duct opening into the pressure medium duct.

The object is furthermore attained by a duct component, which has at least one pressure medium duct and is fitted with at least one duct splitting device splitting the pressure medium duct in a fluid-tight fashion in accordance with the above mentioned specifications.

The duct splitting device in accordance with the invention may be placed and inserted like a plug into the associated pressure medium duct at the desired point of splitting, the adapted shape (matching the cross section of the pressure medium duct) cooperating with peripherally arranged sealing means readily ensuring a reliable fluid-tight splitting of the duct system and it more particularly being possible to dispense with an integration of a customized clamping means in the duct splitter. The desired sealing contact is ensured even by the form of the duct splitter itself as an adapted shape. The stationary location in place is based on a locking effect, a locking part being introduced into a transverse duct connected with the pressure medium duct until it extends into the pressure medium duct and makes locking engagement with the duct splitter. Owing to the extremely simple structure of the duct splitting device low-cost manufacture is possible together with production with small dimensions. Furthermore, the location in position using a locking operation is extremely simple and as a rule does not require any customized tools. Since the sealing means can be adapted at the outset to the cross sectional form of the associated pressure medium duct, optimum design is possible to achieve the desired sealing function without later bracing against the duct wall being necessary after the insertion into the pressure medium duct.

Advantageous developments of the invention are defined in the dependent claims.

The locking means preferably comprises at least one locking recess in the outer periphery of the duct splitter, into which recess the locking part may fit. This locking recess is preferably is designed in the form of a groove extending over the full outer periphery of the duct splitter so that the duct splitter is not in need of any special alignment on introducing it into the duct component.

The locking part and the duct splitter are preferably so matched to one another that an interlocking locking engagement results by means of which the duct splitter is held in a fixed manner or if anything with a small amount of play stationarily.

It is convenient for the duct splitter to comprise a more especially integrally designed splitting body and the sealing means arranged thereon. The splitting body may be manufactured of metal or furthermore of plastic material.

The sealing means can be an integral component of the duct splitter, for example if they are molded by injection molding on the splitting body. In the case of a further working example of the invention the sealing means have a sealing ring held by way of a peripheral groove in the splitting body.

The sealing means it is convenient for the duct splitter to have a adapted shape portion, such section being so designed that it occupies the full cross section of the associated pressure medium duct and which represents the component responsible for the actual fluid-tight splitting effect, of the duct splitter. In addition it is possible however for the duct splitter to possess a further adapted shape section, whose cross section fills the associated pressure medium duct only partly so that the pressure medium may flow past if necessary. The point of engagement for the locking part is in this case preferably axially between the two adapted shape sections.

The locking part is preferably designed like a pin. Moreover, at its outer end opposite to the duct splitter while assuming the locking position it preferably has a handle section, by which the locking part can be grasped on introduction into the transverse duct or while drawing it out without any trouble.

Using suitable securing means it is possible for the locking part to be fixed in the locking position corresponding to locking engagement with the duct splitter. In this case any suitable measure may be adopted, a particularly suitable design being one in which the securing means comprise a securing part straddling the locking part to hold it and are able to be attached to the associated duct component. The securing part may be designed like a cover and possess sealing means, which in the state fixed to the duct component of the securing part make sealing contact with the duct component around the opening of the transverse duct. It is in this manner that leakage of pressure medium from the pressure medium duct through the transverse duct is prevented, if the duct splitter is so designed that it does not hinder access of pressure medium in the interior of pressure medium duct to the opening area of the transverse duct.

The duct splitting device is more particularly suitable for use in connection with a duct component, is designed as a valve carrier and is fitted or is to be fitted with valves controlling a fluid. If such a duct component has branch ducts extending from the pressure medium duct running in the interior there is the advantageous possibility of using at least one such branch ducts as a transverse duct for receiving the locking part. As compared with a separate design, which is also possible, of a transverse duct provided to receive the locking part, this offers the advantage that duct components already present may be fitted with the duct splitting device without any trouble and without any redesigning.

It is an advantage for the longitudinal dimensions of the duct splitter and the position provided on the duct splitter, of the point of engagement for the locking part to be so matched to the mutual distance apart of the branch ducts opening into the pressure medium duct that the point of engagement for the locking part is at the same level as a branch duct, when the duct splitter is introduced into the pressure medium duct as far as engagement with an abutment part such part extending through an adjacent branch duct into the pressure medium duct. This means that it is possible for the point of engagement to be extremely simply and also exactly set in the vicinity of the branch duct to be employed to receive the locking part.

In the following the invention will be explained in detail with reference to the accompanying drawings.

LIST OF THE SEVERAL VIEWS OF THE DRAWINGS

DETAILED ACCOUNT OF WORKING EMBODIMENT OF THE INVENTION

Figure 1:
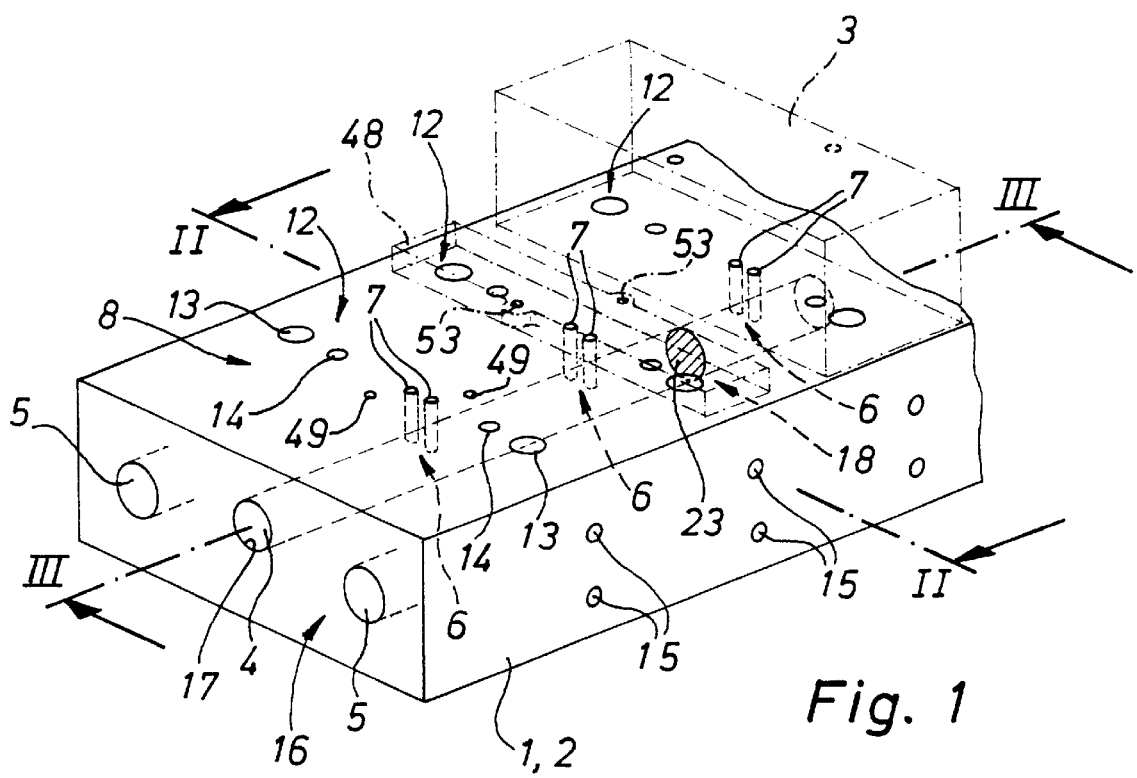
FIG. 1 shows the combination in accordance with the invention of a duct component and duct splitting device associated with a pressure medium duct of such duct component, the point of splitting in the interior of the respective pressure medium duct being marked as a shaded area.
Figure 2:
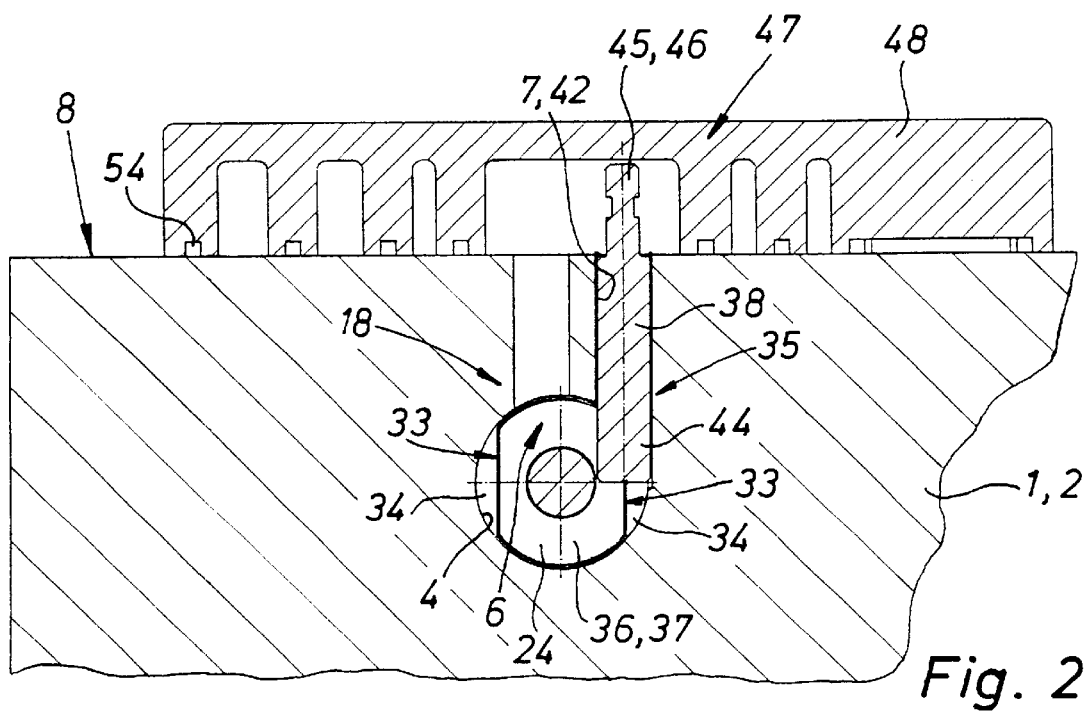
FIG. 2 shows a simplified cross section taken through the arrangement of FIG. 1 at the point of splitting on the section line II—II.
Figure 3:
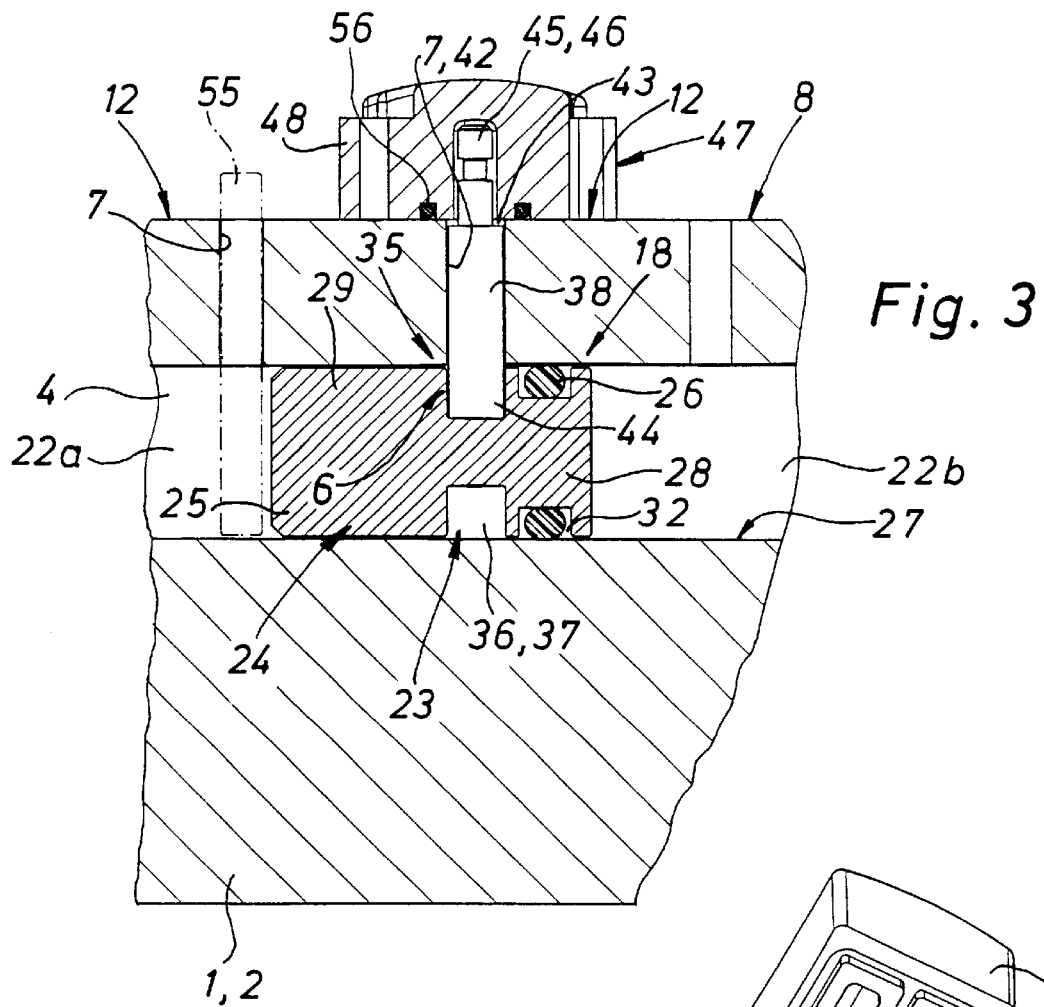
FIG. 3 illustrates a simplified longitudinal section taken through the arrangement of FIG. 1 at the pressure medium duct, having the duct splitting device, on the section line III—III.

The drawings show a duct component 1 having ducts extending through it, FIG. 1 being a longitudinal section through such duct component 1 and FIGS. 2 and 3 being simplified sectional elevations of the duct component 1, in the case of which, for the sake of simplification, some of the ducts are omitted.

The duct component 1 has more particularly a plate-like or rail-like configuration and in the working example constitutes a valve carrier 2, which may be fitted with a plurality of valves 3 controlling a fluid flow. In FIG. 1 one of such valves 3 is indicated in chained lines.

The duct component 1 possesses a pressure medium duct functioning as a supply duct, which to be more distinct in the following is termed a first pressure medium duct 4. It extends through the duct component 1 in the longitudinal direction thereof.

Further pressure medium ducts 5 also run within the duct component 1 and extend in parallelism to the first pressure medium duct 4. Here it is preferably a question of venting ducts. In FIGS. 2 and 3 merely the first pressure medium duct 4 will be seen.

By way of first pressure medium duct 4 it is possible for a fluid pressure medium to be supplied, as for instance a hydraulic pressure medium but however preferably compressed air. By way of the further pressure medium ducts 5 the pressure medium supplied by way of first pressure medium duct 4 may be vented, at least partly.

One or more branch ducts 7 extend at branch points 6 (with a distance between them in the longitudinal direction) from the first pressure medium duct 4—there being two of such ducts 7 in the working example of the invention—the direction of such ducts being athwart, and more particularly perpendicular to, the longitudinal extent of the first pressure medium duct 4, same opening externally on the pressure medium duct 1 at a common component mounting face 8.

The branch ducts 7 extending from the individual branch points 6 run to component mounting sites 12, which are arranged in sequence in the longitudinal direction of the duct component 1, such sites being on the component mounting face 8. At such component mounting sites 12 it is possible for electrically and/or fluid power operated valves 3 to be mounted, and more particularly so-called multi-way valve. As already noted, the drawings show only one of such valves 3 in chained lines. In the completely fitted state a plurality of valves 3 will be seated on the duct component 1, such valves being arranged in sequence in the longitudinal direction of the duct component 1.

Further branch ducts 13 extending from the further pressure medium ducts 5 open in a similar manner at the individual component mounting sites 12 on the component mounting face 8.

Finally the duct component 1 further comprises power ducts 14, which extending from the component mounting faces 12 lead to an other longitudinal outer face of the duct component 1, where they terminate at connection ports 15.

The connection ports 15 are so designed that fluid lines may be connected on them, which lead to one or more loads to be supplied, as for example drives to be operated.

The valves 3 are in a known fashion provided with one or more valve members, which are arranged in one or more valve chambers, which communicate with valve ducts. These valve ducts open externally at a mounting face of the respective valve 3, such face serving for mounting the respective valve 3 at the associated component mounting site 12 on the component mounting face 8. The ports of the valve ducts are so aligned that they are flush with the ports or openings, located at the component mounting sites 12, of the branch ducts 7, 13 and power ducts 14 and so that there is a fluid connection. During operation by suitable control of the valves 3 the pressure medium supplied by way of the first pressure medium ducts 4 may be passed to the power ducts 14 in a controlled manner and the pressure medium returning from the connected loads may flow off by way of venting ducts 5. The duct component 1 in this case functions as a sort of fluid distributor or manifold.

The supply of the pressure medium to the first pressure medium duct 4 is preferably at the terminal face of the duct component 1. The valves 3 are in a known manner provided with one or more valve members arranged in one or more valve chambers, which communicate with valve ducts. If the same supply pressure applies for all connected valves 3, the supply will preferably be from only one terminal face of the duct component 1, for example by way of the duct port 17, provided on the terminal face 16 indicated in FIG. 1, of the first pressure medium duct 4. The valve port, placed on the opposite terminal face, not illustrated, of the duct component 1, of the first pressure medium duct 4 may in this case be closed, for instance using a suitable terminating member.

In some cases particular conditions of an application make it necessary to offer the connected loads with different levels of supply pressures. In this case the duct splitting device 18 in accordance with the invention renders possible a fluid-tight splitting of the first pressure medium duct 4 into two sequentially placed first and second duct sections 22a and 22b. The duct splitting device 18 functions within the first pressure medium duct 4 as a partition, there now being the possibility of supplying the two duct sections 22a and 22b independently of one another with pressure medium, more particularly at different pressure levels, such pressure then being available by way of the branch ducts 7, extending from the respective duct section 22a and 22b, for the connected valves 3. While the first duct section 22a is still supplied by way of the duct port 17 on the one terminal face 16, the supply of the other second duct section 22b is preferably by way of duct port provided on the opposite terminal face of the duct component 1.

The position at which the first pressure medium duct 4 is split in a pressure-tight manner by the duct splitting device 18 will be termed the splitting position 23. One possible position is indicated in FIG. 1 by shading.

The duct splitting device 18 comprises a duct splitter 24 able to be introduced through one of the terminal ports of the first pressure medium duct 4 into the first pressure medium duct 4, such splitter 24 being able to be inserted using a plain rod or some other suitable means as far as the desired splitting position 23.

The duct splitter 24 may be extremely simple in design and in the working example merely comprises an integral splitting body 25 with sealing means 26 arranged at the radially facing outer periphery. The sealing means 26 are provided for sealing cooperation with the wall 27 of the first pressure medium duct 4. In connection with the splitting body 25, which is impervious to gas, it is accordingly possible to have, in the form of the duct splitter 24 within the first pressure medium duct 4, an effective barrier as regards the pressure medium supplied into the first pressure medium duct 4.

The duct splitter 24 does not comprise any means which must be operated following the insertion into the first pressure medium duct 4 in order to produce the necessary sealing contact between the means 26 and the duct wall 27. The reason for this is the particular design of the duct splitter basically selected at the outset as an adapted shape, whose outline is inherently so adapted to the inner form of the first pressure medium duct 4 that the desired sealing effect is obtained. The duct splitter 24 only needs to be placed at the desired splitting position 23 like a plug, where the sealing means 26 cause the desired sealing action directly.

It is preferred for the sealing means 26 to be so designed with an outline somewhat larger than the size of the first pressure medium duct 4 prior to insertion into the first pressure medium duct 4 so that on insertion of the duct splitter 24 such sealing means may be radially elastically deformed and there is a restoring force with which the sealing means 26 brace themselves against the duct wall 27.

On sliding the duct splitter in the first pressure medium duct 4 it is therefore necessary to overcome frictional forces, which result from the contact pressure between the sealing means 26 and the duct wall 27.

The outline of the splitting body 25 is also adapted to the inner form of the first pressure medium duct 4, the adapted shape being so selected that it may be arranged with the least possible play and if anything only with a slight radial play in the first pressure medium duct 5, disregarding the sealing means 26. This means that the duct splitter 24 is stabilized as regards its alignment and position within the first pressure medium duct 4.

The splitting body 25 is for example of metal and may preferably consist of aluminum material. A plastic design is possible too.

Preferably the duct splitter 24 has a first adapted shape section 28 at the sealing means 26, such section 28 being so designed that it occupies the full cross section of the first pressure medium duct 4. At the first adapted shape section 28 the splitting body 25 has an outline corresponding to the inner form of the first pressure medium duct 4, the sealing means 26 preferably consisting of one or more sealing rings, which are held in a peripheral groove extending around the splitting body 25, in the splitting body 25.

In the working embodiment the duct splitter 24 has a further, second adapted shape section 29, which axially adjoins the first adapted shape section 28. it is so designed that it only partly occupies the cross section of the associated first pressure medium duct 4, something which is made clear in FIG. 2. While the first adapted shape section 28 is jointly constituted by the splitting body 25 and the sealing means 26, the second adapted shape section 29 exclusively consists of a longitudinal section of the splitting body 25. The latter has the form of a cylinder flattened to have diametrally opposite peripheral flattened faces, intermediate spaces 34 being defined between the flatter faces 33 and the section, facing same, of the duct wall 27. The intermediate spaces may also be defined by some other configuration of the second adapted shape section 29.

Preferably the two adapted shape sections 28 and 29 constitute the mutually opposite terminal section of the duct splitter 24 so that the intermediate spaces 24 are open toward the adjacent first duct section 22a.

In order to be able to secure the duct splitter 23 at the desired splitting position 23 the duct splitting device 18 is provided with suitable securing means, which are advantageously designed in the form of locking means 35. By means of such the locking means 35 the duct splitter 24 is preferably merely interlockingly and detachably secured to the duct component 1 in place.

The locking means preferably comprise a locking recess 36 provided in the outer periphery of the duct splitter, such recess being preferably in the form of a peripheral groove 37 extending over the entire outer periphery of the duct splitter 24. The working embodiment possesses one such peripheral groove 37, which is preferably between the two adapted shape sections 28 and 29.

Furthermore the locking means 35 comprise a preferably pin-like locking part 38, which is able to be moved through a transverse duct 42, which is opens into the first pressure medium duct 4, to lockingly engage the duct splitter 24 by extending into the locking recess 36.

The transverse duct 42 is open at one outer face of the duct component 1 so that the locking part 38 may conveniently be inserted through the corresponding opening 43 into the transverse duct 42 from the outside until a locking section 44 extends out of the transverse duct into the first pressure medium duct 4 and thence into the locking recess 36 of the duct splitter 24. The locking section 44 is preferably constituted by a terminal section of the locking part 38 having a terminal section of the longitudinal extent.

The locking section 44 and the locking recess 36 are preferably so matched in their transverse dimensions that the locking engagement, at least in the longitudinal direction of the associated first pressure medium duct 4, is an interlocking locking engagement and the duct splitter is held free of play in the axial direction.

Within the transverse duct 42, which preferably is perpendicular to the first pressure medium duct 4, the locking part 38 may be supported laterally and accordingly take up the forces acting by way of duct splitter 24 on it without any trouble. It is an advantage if the locking part 38 is an adapted shape able to be inserted into the transverse duct 42 without any play or with only a small amount of play. The cross section of the transverse duct 42 and of the locking part 38 is preferably circular.

In principle it would be possible to provide several locking parts 38 for locking the duct splitter 24 in a stationary manner, but however as a rule a single locking part 38 will certainly be sufficient.

The transverse duct 42 serving receive the locking part 38 may in principle be self-contained duct only serving for locking purposes. However, it is more advantageous to employ the design of the working example, in the case of which the branch ducts 7, which are in any case present, of the first pressure medium duct 4 are utilized as a transverse duct 42 to receive the locking part 38. It is in this manner that the duct splitting device 18 may be united without any trouble with a duct component 1, something which more particularly renders possible simple upgrading of existing equipment.

Given a suitable design of the branch ducts 7 it is even possible to use one of these branch ducts 7 to receive the locking part 38 and nevertheless to further use the valve 3 on the associated component mounting site without any substantial limitation. In the working embodiment this possibility occurs because respectively two branch ducts 7 extend from the branch positions 6 to the associated component mounting site 12 and accordingly during use of one of such branch ducts 7 as a transverse duct 42 the other branch duct 7 is still available for fluid transfer between the first pressure medium duct 4 and the mounted valve 3. In this case the pressure medium may flow through intermediate spaces 34 on the longitudinal side past the duct splitter 34 in order to pass on to the free branch duct 7, which is located at the same level as the locking engagement between the locking part 38 and the splitting body 35.

The length of the locking part 38 is preferably so selected that, when the locking engagement has been made, it has its outer terminal section 45, which is opposite to the locking section 44, protruding out of the duct component 1. In the working embodiment it has this outer terminal section 45 projecting past the component mounting face 8. This means that the outer terminal section 45 may function as a handle section 46, at which the locking part 38 may be engaged in order to insert the locking part 38 into the transverse duct 32 or, if not to be employed, to pull it out.

It is advantageous if the duct splitting device 18 also has securing means 47, which secure the position of the locking part 38 in the locking position engaged with the duct splitter 24.

Such securing means 47 could for instance comprise a securing screw, which is able to be set of the duct component in such a manner that it simultaneously serures the locking part 38. It would be feasible as well to fit the locking part 38 and the transverse duct 42 with mutually complementary screw thread means so that the locking part 38 would not be exclusively in the form of an inserted or male part as in the working example, but would in part or completely be in the form of a screwed in part.

The locking part 38 in the working embodiment is, as already mentioned, an inserted or male part, which is inserted only with a plugging operation on the duct component. The securing means 47 constitute practically an abutment, which prevents dropping or pulling out of the locking part 38 from the transverse duct.

If the duct splitting device 18 is adjacent to one component mounting site 12 bearing a valve 3, the valve 3 itself may function as a securing part with a suitable abutment function. If on the other hand the associated component mounting site 12 does not bear a valve 3, as is the case of the component mounting site depicted in FIGS. 2 and 3, the securing means 47 will preferably comprise a separate securing part 48, which is mounted instead of the valve 3 at the respective component mounting site 12. Using the attachment means 49 provided on the duct component 1 same may be fixed on the duct component 1. In the working embodiment the attachment means arranged on the duct component 1 comprise tapped attachment holes, aligned attachment holes 53 being provided on the securing part 48 for respectively one attachment screw to be inserted into it for screwing into the tapped holes.

In the assembled condition on the duct component 1 the securing part 48 straddles the outer terminal section 45 of the locking part 38 and secures its position like an abutment element.

In the working embodiment the securing part 48 performs a sealing function as well since it seals off the ducts, opening at the associated component mounting site 12, of the duct component 1 in a fluid-tight fashion. This means that the fluid control device, composed of the valves 3 and the duct component 1 remains fully functional.

Figure 4:
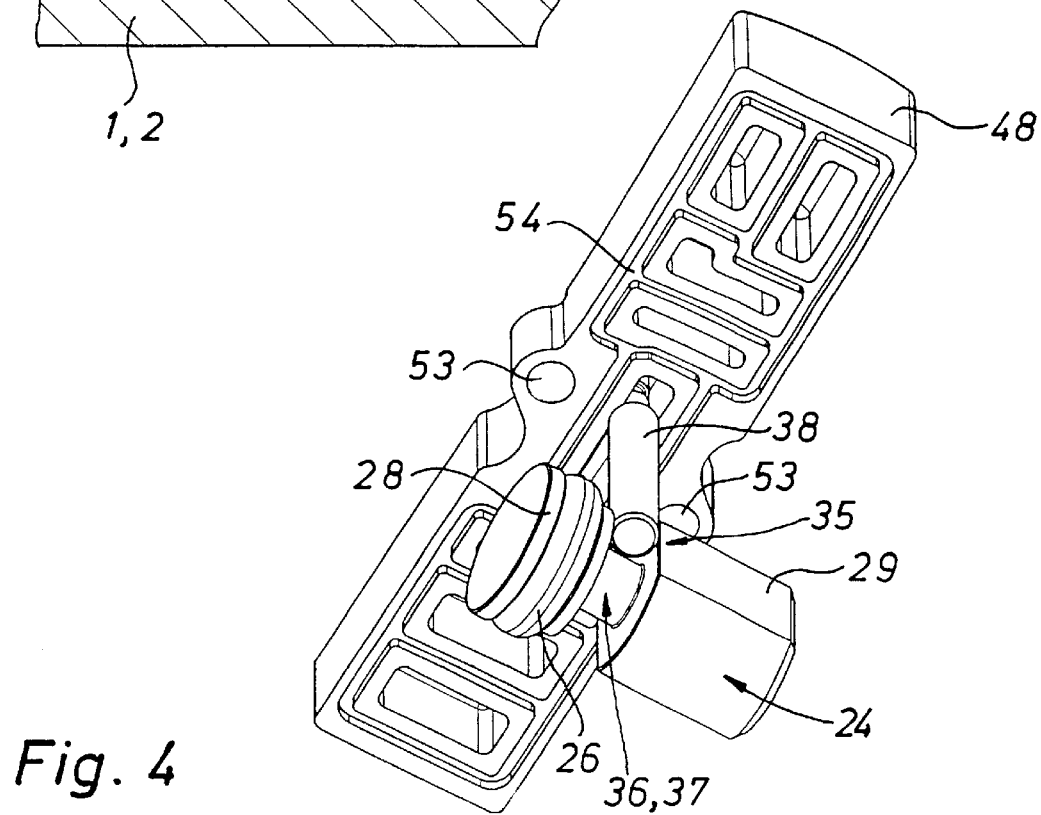
FIG. 4 is a perspective separate representation of the duct splitting device without indicating the associated duct component.

It is convenient for the securing part 48 to be fitted with sealing means on the lower side facing the component mounting face 8, such sealing means making sealing contact, in the condition mounted on the duct component 1, with the duct component 1 around the port of the transverse duct 42 and preferably furthermore around the ports of the other branch ducts. In FIG. 4 recesses 54 will be seen on the lower side of the securing part 48, into which the sealing means 56 may fit.

It will be clear that the sealing or closing part does not necessarily have perform a position securing function as regards the locking part 38, if a suitable position securing function is performed in some other way.

In order to install the duct splitting device 18 it is sufficient to shift the duct splitter 24 using some suitable means as far as the desired splitting position 23 and to arrest it there by the introduction of the locking part 38. The positioning of the duct splitter 24 may for example be simplified by so matching its length dimensions and the position of the engagement position on the duct splitter 24 for the locking part 38 to distance apart, as measured in the longitudinal direction of the first pressure medium duct 4, of the branch ducts 7 that the position of engagement is at the same level as a branch duct 7 employed as a transverse duct 42, when the duct splitter 24 is inserted as far as engagement with an abutment part (introduced through an adjacent branch duct into the first pressure medium duct 4) into the pressure medium duct 4.

FIG. 3 shows by means of chain lines how for example the pin-like abutment part 55 is introduced into a branch duct 7 until it extends into the first pressure medium duct 4. The second adapted shape section 29 adjoining the locking recess 36 has a length which is equal to the axial distance between the branch duct 7, fitted with the abutment part 55, and the branch duct 7 adjacent to this branch duct 7 and employed as a transverse duct 42. The duct splitter 24 may now be simply introduced so far into the first pressure medium duct 4 that it abuts the terminal face of the second adapted shape section 29 on the abutment part 55. Then the engagement position, defined in the present case by the locking recess 36, for the locking part 38, will automatically be at the same level as the desired transverse duct 42.

What is claimed is:

1. A duct splitting device for the fluid-tight splitting of a pressure medium duct provided in a duct component into two sequentially placed duct sections, comprising a duct splitter adapted to be inserted as far as the desired point of splitting into the respective pressure medium duct, such duct splitter having sealing means adapted for sealing cooperation with the wall of the pressure medium duct, and furthermore securing means for fixing the duct splitter at the position of splitting, wherein the duct splitter is designed in the form of a plug-like adapted shape able to be set in the respective pressure medium duct, such adapted shape having sealing means arranged at its outer periphery and the securing means are designed in the form of locking means and comprise at least one locking part able to be brought into locking engagement with the duct splitter through a transverse duct opening into the pressure medium duct.

2. The duct splitting device as set forth in claim 1, wherein the locking means comprise at least one locking recess in the outer periphery of the duct splitter into which the locking part may fit.

3. The duct splitting device as set forth in claim 2, wherein the locking recess is in the form of a peripheral groove extending over the full outer periphery of the duct splitter.

4. The duct splitting device as set forth in claim 1, wherein the locking part and the duct splitter are so designed that at least in the longitudinal direction of the associated pressure medium duct there is an interlocking locking engagement.

5. The duct splitting device as set forth in claim 1, wherein the duct splitter includes a splitting body, more particularly of integral design, and the sealing means arranged on it, the locking engagement being provided between the locking part and the splitting body.

6. The duct splitting device as set forth in claim 5, wherein the sealing means possesses at least one sealing ring held in a peripheral groove in the splitting body.

7. The duct splitting device as set forth in claim 1, wherein the duct splitter has an adapted shape section adjacent to the sealing means, such section being so designed that it occupies the entire cross section of the associated pressure medium duct.

8. The duct splitting device as set forth in claim 7, wherein the duct splitter has a further adapted shape section which is so designed that it only partially occupies the cross section of the associated pressure medium duct, the position of engagement for the locking part preferably being located axially between the two adapted shape members.

9. The duct splitting device as set forth in claim 8, wherein the further adapted shape section possesses one or more flattened faces.

10. The duct splitting device as set forth in claim 1 wherein the at least one locking part is pin-like in form.

11. The duct splitting device as set forth in claim 1, wherein the at least one locking part has such a length that in the locked state its terminal section, opposite to the duct splitter, extends some distance from the associated duct component, the projecting terminal section preferably forming a handle section for gripping the locking part.

12. The duct splitting device as set forth in claim 1, comprising means for securing the position of the locking part in the locking position in locking engagement with the duct splitter.

13. The duct splitting device as set forth in claim 12, wherein the securing means include a securing part holding and straddling the locking part and to be attached to the associated duct component.

14. The duct splitting device as set forth in claim 13, wherein the securing part is designed in the form of a preferably cover-like sealing part and has sealing means, which, when the securing part is attached to the duct component make sealing contact with the duct component at least around the port of the transverse duct.

15. A duct component with a duct splitting device, comprising a duct component, which has at least one pressure medium duct, with which there is associated at least one duct splitting device as set forth in claim 1.

16. The duct component with a duct splitting device as set forth in claim 1, wherein the duct component is designed as a valve support for valves serving for fluid control.

17. The duct component with a duct splitting device as set forth in claim 16, wherein the pressure medium duct containing the duct splitter has a plurality of branch ducts extending from it which open at a component mounting face for the valves and of which at least one forms a transverse duct to receive a locking part.

18. The duct component with a duct splitting device as set forth in claim 17, wherein the length dimensions of the duct splitter and the position of the engagement face provided on the duct splitter for the locking part are so matched that the engagement position is at the same level as the duct splitter, when the duct splitter is inserted as far as engagement with an abutment part introduced through an adjacent branch duct, (which is introduced into the pressure medium duct), into the pressure medium duct.

* * * * *